United States Patent [19]
De Schepper et al.

[11] 4,332,684
[45] Jun. 1, 1982

[54] PROCESS FOR TREATING AN ORGANIC PHASE CONTAINING IRON CHLORIDE, MOLYBDENUM CHLORIDE AND HCL

[75] Inventors: Achille De Schepper, Lichtaart; Marc Coussement, Hove, both of Belgium

[73] Assignee: Metallutgie Hoboken-Overpelt, Brussels, Belgium

[21] Appl. No.: 169,517

[22] Filed: Jul. 21, 1980

[30] Foreign Application Priority Data

Aug. 13, 1979 [LU] Luxembourg .............................. 81600

[51] Int. Cl.³ ............................................. B01D 11/00
[52] U.S. Cl. ..................................... 210/634; 423/139
[58] Field of Search ......................... 423/54, 139, 149; 75/80, 121; 210/634

[56] References Cited

U.S. PATENT DOCUMENTS 3,763,303  10/1973  Khuri et al. ........................... 423/54
3,832,165  8/1974  Kane et al. .............................. 75/80

Primary Examiner—Frank A. Spear, Jr.
Attorney, Agent, or Firm—Fred Philpitt

[57] ABSTRACT

A process for re-extracting trivalent iron and hexavalent molybdenum from an organic phase containing an organophosphoric compound.

In a first step the organic phase is contacted with such a quantity of water that most of the iron and only a minor part of the molybdenum are re-extracted.

In a second step the partially unloaded organic phase is contacted with such a quantity of water that most of the molybdenum contained therein is re-extracted.

This two-step re-extraction process permits obtaining a high reextraction yield for both molybdenum and iron, while ensuring the production of a concentrated eluate.

8 Claims, No Drawings

PROCESS FOR TREATING AN ORGANIC PHASE CONTAINING IRON CHLORIDE, MOLYBDENUM CHLORIDE AND HCL

The present invention relates to a process for treating an organic phase containing iron chloride, molybdenum chloride and HCl in order to obtain an aqueous solution of iron chloride and molybdenum chloride, this organic phase having been used for extracting trivalent iron and hexavalent molybdenum from an aqueous acid chloride solution and containing to this end an extracting agent consisting of an organophosphoric compound and an agent to prevent emulsion formation consisting of a long chain aliphatic alcohol.

In such process, it is important to treat the organic phase in such a way that, on the one hand, its final iron and molybdenum content is low so that it can be used again under optimal conditions for the extraction of new quantities of trivalent iron and hexavalent molybdenum and that, on the other hand, the aqueous solution obtained has the highest possible iron- and molybdenum content so that its further treatment, that can comprise a pyrohydrolysis step, might take place under the most economic conditions. In other words, it is important to use as little re-extracting agent as possible and to obtain at the same time a high re-extraction yield for iron and molybdenum.

A process of the above type is described in example 4 of our copending application Ser. No. 169,518 headed "Process to separate the trivalent iron from an aqueous chloride solution" and filed the same day as the present application by the Applicant of the present application. According to this example 4, the organic phase is first washed with a small quantity of water so as to produce a very acid wash-water and the washed organic phase is then contacted with water so as to re-extract most of the iron and molybdenum and to produce one concentrated aqueous eluate. Thereby is obtained a good re-extraction yield for iron, but a rather low one for molybdenum.

The aim of the present invention is to provide a process of the above-mentioned type which permits obtaining a high re-extraction yield for both molybdenum and iron, while ensuring the production of a concentrated eluate.

To this end, the process of the present invention comprises the following steps:

(a) contacting the organic phase with such a quantity of water or acidulated water that most of the iron and only a minor part of the molybdenum contained in the organic phase are re-extracted, thereby producing a first aqueous eluate and a partially unloaded organic phase;

(b) separating the first aqueous eluate from the partially unloaded organic phase;

(c) contacting the partially unloaded organic phase with such a quantity of water or acidulated water so that most of the molybdenum contained in the partially unloaded organic phase is re-extracted, thereby re-extracting also most of the iron contained in the partially unloaded organic phase and producing a second aqueous eluate and a regenerated organic phase; and (d) separating the second aqueous eluate from the regenerated organic phase.

Thus, water or acidulated water, which means water with a low acid content, preferably with a low hydrochloric acid content, is used as a re-extracting agent. The acidity of the re-extracting agent is advantageously just enough to avoid hydrolysis of the iron chloride. Mostly, a re-extracting agent with a pH between about 0.8 and about 7 can be used.

Advantageously, the quantities of iron and molybdenum that are re-extracted in step (a) are such that the partially unloaded organic phase obtained in this step can be treated in step (c) with as little re-extracting agent as possible. These optimum quantities depend on the composition of the organic phase to be treated and can for each particular case be easily determinated in an experimental way. These optimum quantities will mostly be re-extracted when such a quantity of re-extracting agent is used that the Cl$^-$ ions content of the first eluate ranges between about 65 and about 75 g/l.

The quantity of molybdenum to be re-extracted in step (c) depends, of course, on the destination of the regenerated organic phase. If it is desired to use this regenerated organic phase further to extract substantially the whole hexavalent molybdenum content from an impure aqueous solution, its residual molybdenum content should be very small. On the contrary, if only a partial extraction of said molybdenum is aimed at, the residual molybdenum content of the regenerated organic phase may be rather high. Generally an appropriate quantity of molybdenum is re-extracted in step (c) when a quantity of re-extracting agent is used such that the Cl$^-$ ions content of the second eluate ranges between about 47 and about 57 g/l.

Before carrying out step (a) it is useful to wash the organic phase with a small quantity of water, which makes it possible to obtain in step (a) a purer and less acid eluate. This quantity of water should be so small that the obtained wash-water contains at least about 105 g/l of Cl$^-$ ions and at least about 18 g/l of HCl.

The process of the present invention is advantageously used to treat an organic phase containing an organophosphoric compound chosen among the phosphoric acid esters having the formula

the phosphonic acid esters having the formula

the phosphonous acid esters having the formula

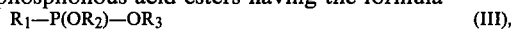

the phosphinic acid esters having the formula

and the phosphinous acid esters having the formula

in which $R_1$, $R_2$ and $R_3$ represent the same or different, unsubstituted or substituted hydrocarbon groups.

There can be used as compound of formula (I), the phosphoric acid esters described and mentioned in column 4, lines 17–38 of U.S. Pat. No. 3,832,165.

There can be used as a compound of formula (II), the phosphonic acid esters described and mentioned in the German Offenlegungsschrift No. 2,232,460 and the British Pat. No. 1,428,278.

There can be used as a compound of formula (IV), the phosphinic acid esters described and mentioned in the German Offenlegungsschrift No. 2,315,869 and in the above-mentioned British Pat. No. 1,428,278.

The organic phase to be treated according to the process of the present invention contains advantageously as a long chain aliphatic alcohol, an alcohol containing from about 8 to about 16 carbon atoms such as isodecanol, which is preferred, and the alcohols mentioned in column 6, lines 23–27 of the above-mentioned U.S. Pat. No. 3,832,165.

The organic phase to be treated can also contain an inert aliphatic diluent such as kerosene.

With the process of the present invention an organic phase can be treated with any aliphatic alcohol content. This content can, for instance, be just sufficient to avoid the formation of an emulsion, or it can be much higher like proposed in copending Ser. No. 169,518.

The example hereafter will better illustrate the process of the invention and its advantages.

This example concerns the re-extraction, according to the process of the present invention of iron and molybdenum from an organic phase practically identical to the washed organic phase obtained in example 4 of copending application Ser. No. 169,518.

This organic phase is composed of 20 percent by volume of tributyl phosphate (TBP), 50 percent by volume of isodecanol and 30 percent by volume of kerosene, and it contains in g/l: 15.84 $Fe^{3+}$, 0.131 $Mo^{6+}$, 0.005 $V^{4+}$, 0.176 Mn, 9.62 HCl.

In a first re-extraction step, most of the iron and a minor part of the molybdenum contained in this organic phase is re-extracted by treating the latter with water, counter-currently, in 4 stages and with an organic phase:aqueous phase ratio equal to 6.25.

This yields a partially unloaded organic phase as well as an eluate containing in g/l: 85.588 $Fe^{3+}$, 0.188 $Mo^{6+}$, 0.028 $V^{4+}$, 0.878 Mn, 43.45 HCl.

In a second re-extraction step, practically all the remainder of the molybdenum and iron contained in the partially unloaded organic phase is re-extracted by treating the latter counter-currently with water, in 4 stages and with an organic phase:aqueous phase ratio equal to 14.3

There is obtained a partially regenerated organic phase as well as a second eluate containing in g/l: 28.211 $Fe^{3+}$, 1.401 $Mo^{6+}$, 0.0019 $V^{4+}$, 0.367 Mn, 20.99 HCl.

The regenerated organic phase contains in g/l: 0.18 $Fe^{3+}$, 0.003 $Mo^{6+}$, 0.0005 $V^{4+}$, 0.001 Mn, 1.20 HCl.

The total re-extraction yield for iron is 98.8 percent and that for molybdenum 97.7 percent. The total quantity of water used in both re-extraction steps is 0.23 liter per liter of organic phase.

In example 4 of copending application Ser. No. 169,518, the washed organic phase is submitted to a one-step re-extraction that consists of treating the organic phase counter-currently with water, in 6 stages and with an organic phase:aqueous phase ratio equal to 5. Thus, the quantity of water used in that example 4 is practically the same as the total quantity of water used in the two re-extraction steps of the present example 1. The re-extraction yield for molybdenum reaches, however, only 62 percent.

We claim:

1. A process for treating a loaded organic phase containing iron chloride, molybdenum chloride and HCl in order to remove iron chloride and molybdenum chloride therefrom, this loaded organic phase having been obtained by extracting trivalent iron and hexavalent molybdenum from an aqueous acid chloride solution with an organic liquid comprising an extracting agent consisting of an organophosphoric compound and an agent to prevent emulsion formation consisting of a long chain aliphatic alcohol, this process being characterized in that it comprises the following sequence of steps:

(a) contacting the loaded organic phase with a sufficient quantity of water or acidulated water so that most of the iron and only a minor part of the molybdenum contained in the organic phase are re-extracted, thereby producing a first aqueous eluate and a partially unloaded organic phase;

(b) separating the first aqueous eluate from the partially unloaded organic phase;

(c) contacting the separated partially unloaded organic phase with a sufficient quantity of water or acidulated water so that most of the molybdenum contained in the partially unloaded organic phase is re-extracted, thereby re-extracting also most of the iron remaining in the partially unloaded organic phase, thereby producing a second aqueous eluate and a regenerated organic phase; and (d) separating the second aqueous eluate from the regenerated organic phase.

2. A process according to claim 1 characterized in that in step (a) a quantity of re-extracting agent is used such that the $Cl^-$ ion content of the first eluate ranges between about 65 and 75 g/l.

3. A process according to claim 1 or 2 characterized in that in step (c) a quantity of re-extracting agent is used such that the $Cl^-$ ion content of the second eluate ranges between about 47 and about 57 g/l.

4. A process according to claim 1 characterized in that prior to step (a), the organic phase is washed with such a small quantity of water that the obtained wash-water contains at least about 105 g/l of $Cl^-$ ions and at least about 18 g/l of HCl.

5. A process according to claim 1 characterized in that the organic phase contains tributyl phosphate as an organo-phosphoric compound.

6. A process according to claim 1 characterized in that the organic phase contains isodecanol as a long chain aliphatic alcohol.

7. A process according to claim 1 characterized in that the organic phase contains an inert diluent.

8. A process according to claim 7 characterized in that the organic phase contains kerosene as an inert diluent.

* * * * *